J. MATTHEWS.
Soda-Water Apparatus.
No. 8,837. Reissued Aug. 5, 1879.
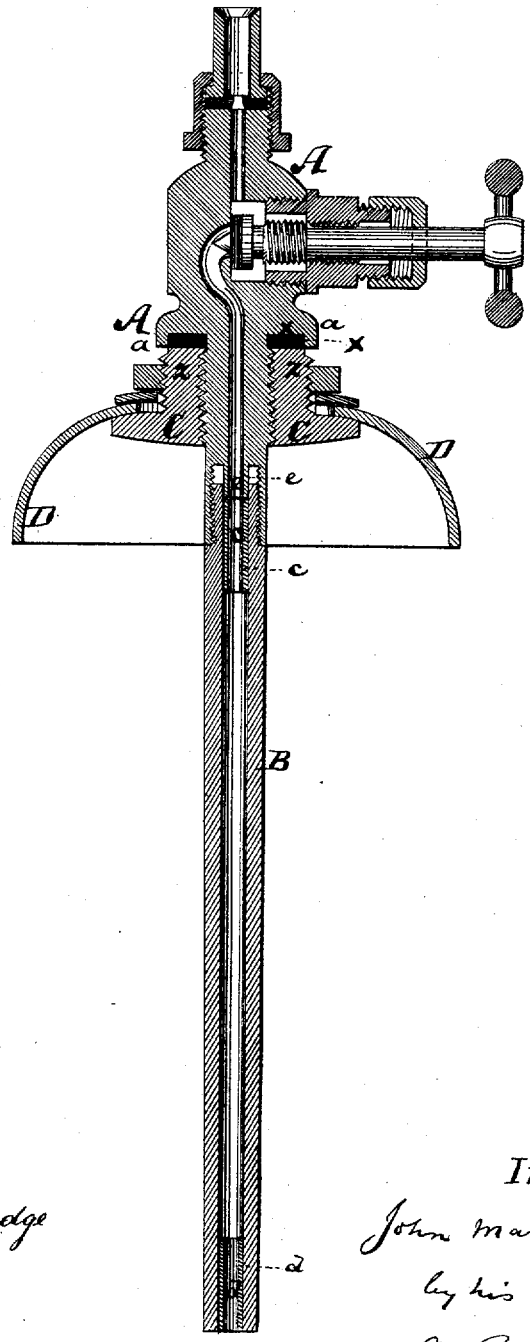
Witnesses:
John C. Tunbridge
W. J. E. Schultz.
Inventor:
John Matthews
by his attorney
A. v. Briesen
THE NORRIS PETERS CO., PHOTO-LITHO., WASHINGTON, D. C.

UNITED STATES PATENT OFFICE.

JOHN MATTHEWS, OF NEW YORK, N. Y.

IMPROVEMENT IN SODA-WATER APPARATUS.

Specification forming part of Letters Patent No. 137,702, dated April 8, 1873; Reissue No. 8,837, dated August 5, 1879; application filed June 26, 1879.

*To all whom it may concern:*

Be it known that I, JOHN MATTHEWS, of New York, in the county and State of New York, have invented a new and Improved Soda-Water Apparatus, of which the following is a specification.

The drawing represents a vertical central section of my improved soda-water apparatus.

This invention relates, first, to a new manner of forming a tight joint between the body and the cock of a soda-water fountain; also, to a new kind of pipe for the interior of the fountain; and, finally, to a new manner of securing the said pipe to the fountain-cock.

The invention consists, first, in forming a recess in the flange of the cock, opposite the projection of the bung, for the reception of a soft metallic or other packing.

I have, previous to this invention, used an annular packing in a recess in the fountain-top; but that construction renders it difficult to insert and replace the packing. It is much easier to replace it on the flange of the cock. I also find that this improvement effects a great saving of gas, which is wasted if the joint is imperfect.

The invention consists, secondly, in the use of a tapering tube, of rubber or other material, and sufficiently stiff to avoid collapse when the cock is opened. A short tube or collar of hard material is inserted into each end of said tube. The collar or short tube at the free end of a flexible tube may serve as a weight if the long tube is not of sufficient weight to cause it to reach to the bottom of the fountain at all times.

Finally, the invention consists in providing the cock with a projecting nipple, which enters the tube and impinges against the ring or collar in the upper end thereof. The tube is secured to an extension of the cock.

In the accompanying drawing, the letter A represents a stop-cock having a flange, *a*, and a downwardly-projecting extension or lower part below said flange. The said extension or lower part is of pure tin, and carries a projecting nipple, *e*, which enters the tube B, that extends into the body of the fountain.

C is the bung, which projects from the fountain-body through an aperture in the shell or body D of the fountain. The flange *a* of the cock is directly above said bung, and is recessed at its under side to receive a soft-metal or other packing, *x*. The projection *z* of the bung of the fountain fits up into this recess and impinges on the packing which is contained in the recess of the flange *a*. The packing *x* is prevented from spreading by the sides of the recess, and thus makes a perfect joint.

The tube B is made slightly tapering, of rubber or other material, and carries a ring, *c*, or collar in the upper end and another ring or collar, *d*, in the free lower end. The nipple *e* of the cock enters the tube B, and impinges against the ring or collar *c*. The elastic tube B is provided with a screw-thread on its exterior to fit the corresponding threads in the extension of the cock.

The small tube or collar *c* within the upper part of the rubber tube B serves to keep the elastic tube properly attached to the screw-thread extension of the cock.

It will be perceived that the extension of the cock is substantially in line with the walls of the tube B, so as to avoid objectionable shoulders and facilitate the insertion of the tube in the fountain.

The elastic tapering pipe B, by its flexibility, reaches the parts of the fountain which are lowest, and enables the fountain to be entirely emptied in any position. Being tapering, the tube is more evenly flexed, so that it is not broken off near the cock by constant bending.

The tube is of rubber or other elastic substance, weighted with ingredients incorporated in the rubber; but, to avoid contamination, the interior and exterior of this kind of tube is coated with pure Para gum, which prevents contamination of the beverage.

I claim—

1. The combination of the cock A, having recessed flange *a* and packing *x* in the recess, with the bung C and shell or body D of the fountain, substantially as herein shown and described.

2. A tapering tube, B, formed with rings or collars in each end, formed as herein specified, and for the purpose named.

3. The combination of the tube B with the cock A, the tube having an exterior screw-thread, and the extension of the cock an interior screw-thread and inner nipple, substantially as specified.

4. In combination with the cock A, the tapering tube B, substantially as specified.

5. The elastic tube B, containing the inner ring, *c*, in combination with the cock A, having threaded extension and inner nipple, *e*, substantially as specified.

JOHN MATTHEWS.

Witnesses:
T. B. MOSHER,
F. V. BRIESEN.